Figure 1:
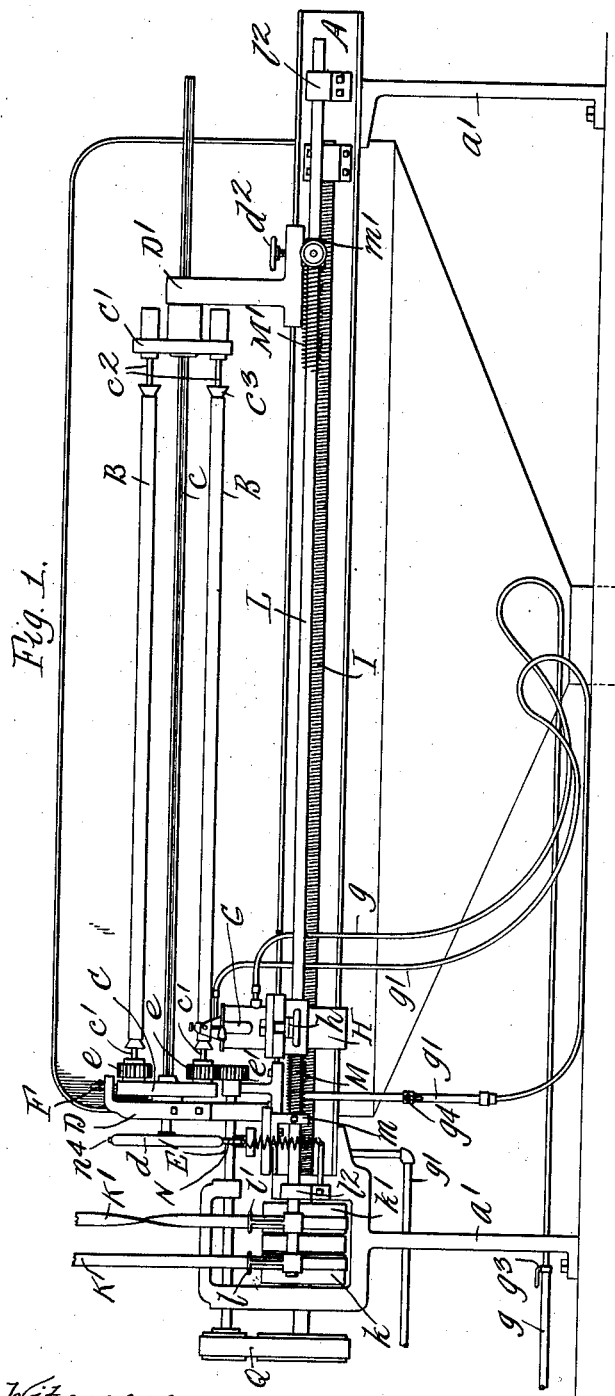

C. VALLONE & J. H. ILLIG.
MACHINE FOR COATING TUBES AND THE LIKE.
APPLICATION FILED OCT. 24, 1912.

1,103,713.

Patented July 14, 1914.

3 SHEETS—SHEET 1.

Witnesses.

Inventors
Charles Vallone
John H. Illig
by Wilhelm Parker & Ward,
Attorneys.

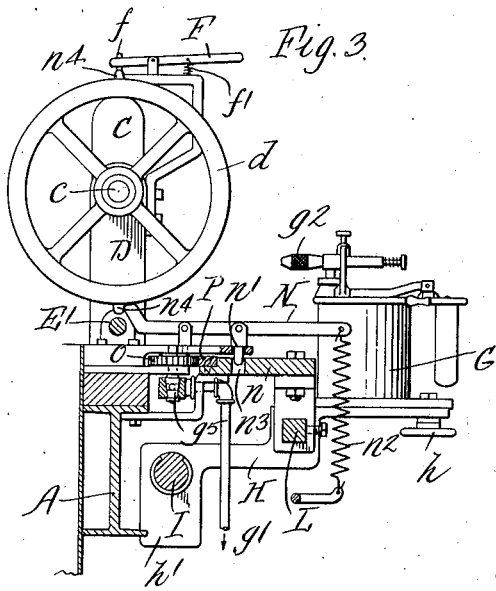
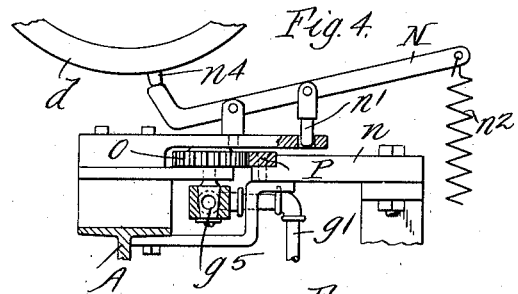
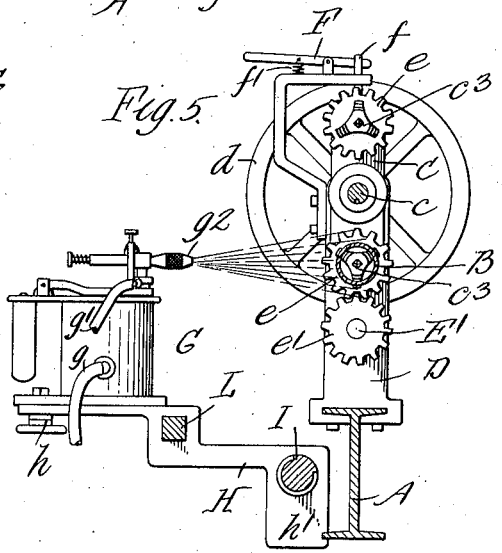
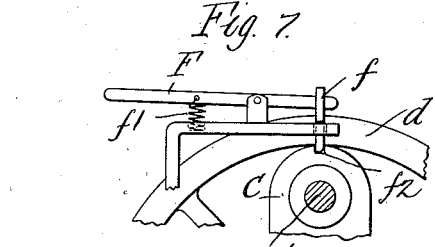
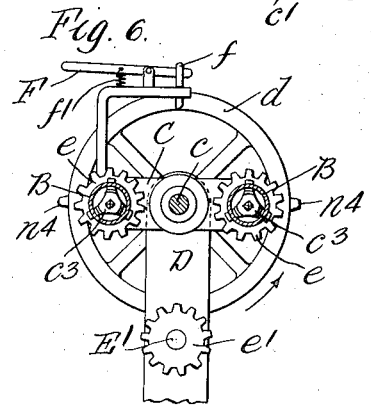
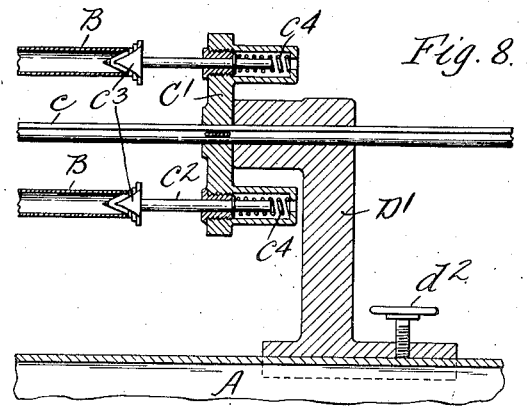

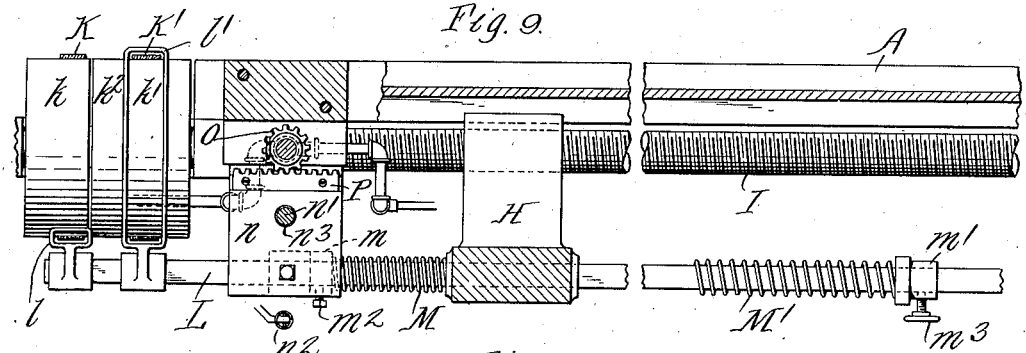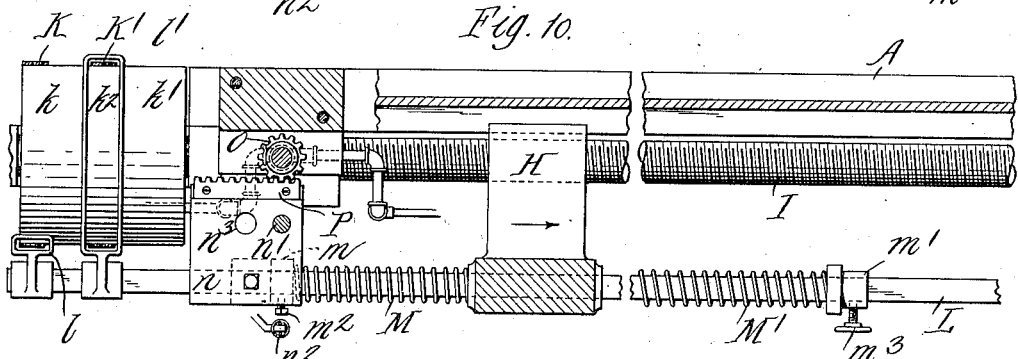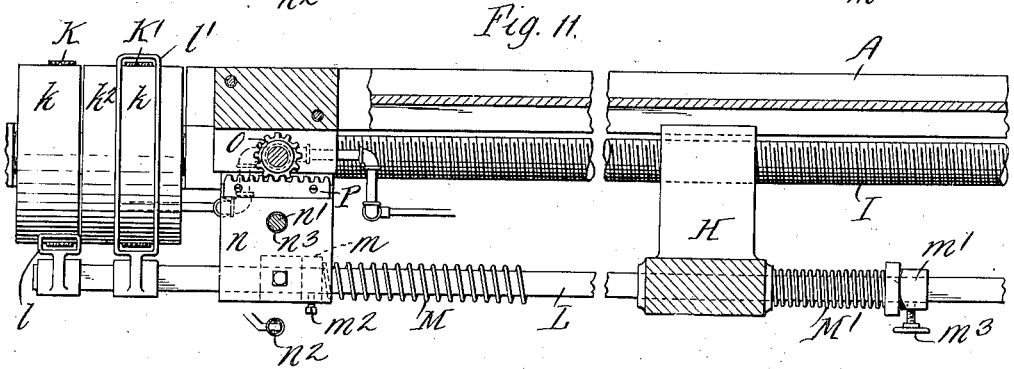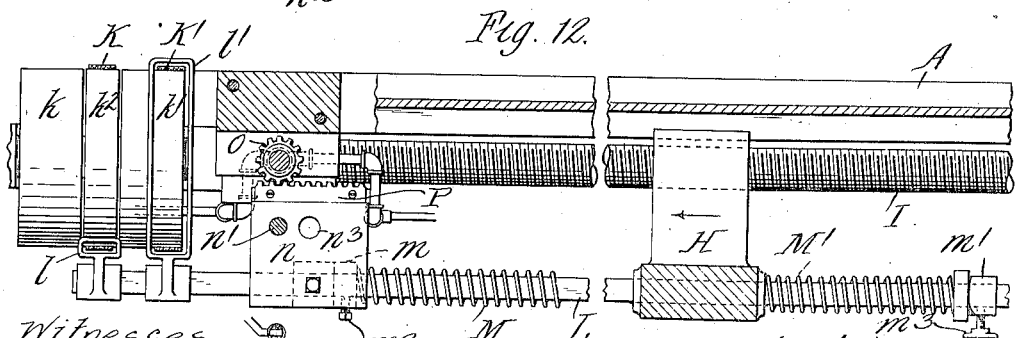

UNITED STATES PATENT OFFICE.

CHARLES VALLONE AND JOHN H. ILLIG, OF BUFFALO, NEW YORK, ASSIGNORS TO BARCALO MANUFACTURING CO., OF BUFFALO, NEW YORK.

MACHINE FOR COATING TUBES AND THE LIKE.

1,103,713. Specification of Letters Patent. Patented July 14, 1914.

Application filed October 24, 1912. Serial No. 727,585.

*To all whom it may concern:*

Be it known that we, CHARLES VALLONE and JOHN H. ILLIG, citizens of the United States, residing at Buffalo, in the county of Erie and State of New York, have invented a new and useful Improvement in Machines for Coating Tubes and the like, of which the following is a specification.

This invention relates more particularly to machines for coating metal tubes, rods and the like with lacquer or other liquid coating material adapted to be applied by means of an air brush or spraying device, the invention being primarily intended for machines for lacquering the tubes used in the manufacture of brass bedsteads.

For the sake of brevity of description the term "tube" is employed in this specification to designate the articles to be coated, and the coating material is designated as "lacquer," but it is not intended thereby to restrict the invention of this application to machines adapted only for lacquering tubes, since it is equally applicable to machines for applying coatings of other material to rods, bars and other articles of analogous shape.

The primary object of the invention is to produce a practical and efficient machine by which metal tubes, or analogous articles, can be uniformly and perfectly covered with a coating material rapidly and with the minimum labor.

Another object is to produce a lacquering or coating machine of novel and improved construction in the various respects hereinafter described and set forth in the claims.

The machine comprises a holder which is adapted to support a plurality of tubes, and to be moved to place the tubes, one after another, in position to be coated, and an air brush or coating device which travels longitudinally from end to end of the tube for applying the coating material to the same. The brush or coating device is moved back and forth parallel with the tubes in the holder by an intermittent reversible feed mechanism which arrests the brush when it reaches the end of its travel in each direction. While the brush is traveling in either direction and coating one tube, the tube previously coated is removed from the holder and replaced by another tube, and when the brush comes to rest at the end of its travel, the holder is turned to present the new tube to the brush. The operation of the tube holder reverses the feed mechanism and causes the return movement of the brush during which the newly presented tube is coated. In this way the operator has an opportunity to remove a coated tube and place another tube to be coated in position in the holder during the time that the brush is operating on each tube, and the holder can be quickly shifted as soon as one tube is finished to present the next tube to the brush, thereby enabling the rapid operation of the machine. Each tube is revolved about its axis while being coated, so that the lacquer is evenly distributed over the entire surface of the tube.

Figure 2:
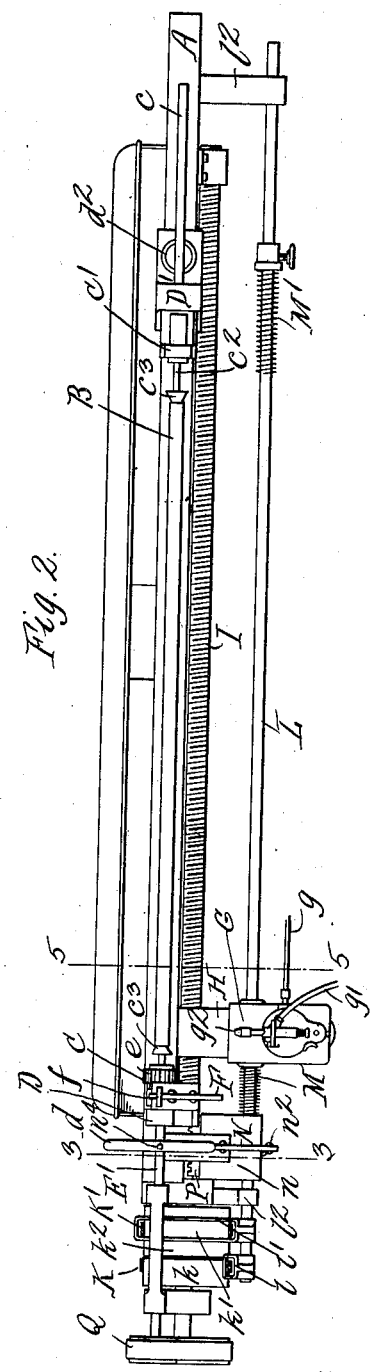

In the accompanying drawings consisting of three sheets: Figure 1 is a front elevation of a coating machine embodying the invention. Fig. 2 is a plan view thereof. Figs. 3 and 4 are cross sectional elevations thereof on enlarged scales in line 3—3, Fig. 2, showing different positions of the parts. Figs. 5 and 6 are cross sectional elevations of the machine, on an enlarged scale in line 5—5, Fig. 2, showing different positions of the tube holder. Fig. 7 is an elevation partly in section showing the latch for the tube holder. Fig. 8 is a fragmentary longitudinal section of the tail end of the tube holder. Figs. 9–12 are similar sectional plan views on an enlarged scale of the brush reciprocating mechanism, showing different positions of the parts.

Like reference characters refer to like parts in the several figures.

The stationary frame of the machine consists of a horizontal bed or track A of any suitable form, supported by suitable legs or standards $a'$. The tubes to be lacquered, which are indicated at B, are removably supported above the bed, parallel therewith, by a rotatable tube holder consisting of head and tail pieces or spindle carriers, C C' connected by a shaft $c$ and provided with rotary spindles $c'$ $c^2$ between which the tubes are revolubly supported. The holder preferably has two pairs of spindles for supporting two tubes. The inner ends of the spindles $c'$ $c^2$ may be of any suitable form adapted to engage and hold the tubes or other articles to be coated, the ends $c^3$ of the spindles shown, see Figs. 5, 6 and 8, being of triangular shape having notched edges adapting them to enter and support tubes of different diameters. The tail spindles $c^2$ are pressed inwardly into engagement with the tubes by suitable springs $c^4$, Fig. 8, which allow the spindles to yield to permit the tubes to be readily placed in position in and removed from the holder.

The shaft $c$ of the holder is journaled in head and tail bearings D, D' on the bed A and is provided adjacent to the head bearing with a hand wheel $d$ for turning the holder to bring the tubes, one after another, into operative relation to the brush or coating device. The head bearing may be rigidly or adjustably secured as desired, but the tail bearing D' is preferably slidably mounted on the bed and the tail spindle carrier C' is splined on the shaft $c$, so that the tail spindles can be adjusted toward or from the head spindles, as may be required to accommodate tubes of different lengths. The tail bearing is provided with suitable means, such as a set screw $d^2$ for securing it when adjusted.

Each of the head spindles $c'$ is provided with a gear wheel $e$ and when the tube holder is turned to place a tube in operative relation to the coating device, the gear wheel $e$ on the head spindle for that tube is placed in mesh with a gear wheel $e'$ on a shaft E' for revolving the tube while it is being lacquered. The shaft E' is suitably journaled on the stationary frame and is driven, preferably as hereinafter described.

F, Figs. 5-7, represents a latch for releasably retaining the tube holder stationary with one of the tubes in position for lacquering. The latch shown consists of a lever pivoted on the head bearing and provided with a bolt $f$ which is pressed against the edge of the head spindle carrier C by a spring $f'$ acting on the lever. The head spindle carrier is provided with a notch $f^2$, Fig. 7, in its edge at each end, into which the dog is adapted to spring for holding the tube holder stationary. The tube holder is released when it is to be turned by depressing the front end of the latch lever F.

A tube holder of any other suitable construction adapted to rotatably support two or more tubes and adapted to be moved for placing one tube after another in position to be lacquered could be employed, and means of different construction could be used for releasably securing the holder in its different operative positions and for revolving the tubes while being lacquered.

G represents the air brush or coating device for applying the lacquer or other coating material to the tubes. This invention is not concerned with the particular construction of the brush or coating device, and an air brush or coating device of any well known or suitable construction can be employed.

$g$, $g'$ represent, respectively, the lacquer and compressed air supply pipes or hose for the brush, and $g^2$ the nozzle thereof by which the atomized lacquer or other coating material is discharged against the tubes. Portions at least of the supply pipes $g$ $g'$ are flexible to permit the travel of the brush along the bed A of the machine, and the pipes are provided with valves $g^3$ $g^4$ for shutting off the lacquer and air. The air pipe is also provided with a controlling valve $g^5$, Figs. 3 and 4, for automatically stopping the discharge of the lacquer when the brush comes to rest at the end of its travel in each direction.

The air brush G is mounted and reciprocated lengthwise of the tubes, preferably as follows:—H represents a supporting arm or carriage on which the brush is removably secured, for instance, by a clamping screw $h$, and which is arranged to be reciprocated by a feed screw I which extends lengthwise of and is suitably journaled on the bed A of the machine. The carriage H, shown, has a screw threaded hole through which the screw I passes and a foot portion $h'$ at its inner end slidably engaging the lower flange of the bed A, whereby the carriage is retained in position and guided in its movements. K, K' represent straight and crossed drive belts for the feed screw, and $k$, $k'$ two loose pulleys, and $k^2$ a tight pulley therefor on the feed screw. When the machine is at rest or the feed screw is not being driven, both of the belts run on the loose pulleys $k$, $k'$ as shown in Figs. 1 and 2. By shifting the belts to place one or the other thereof on the tight pulley $k^2$, the feed screw is driven in one direction or the other for reversing the direction of travel of the brush or coating device. The drive belts are shifted by a shifting rod L provided with loops $l$, $l'$ through which the belts pass. The shifting rod is supported parallel with the feed screw, so as to slide or shift endwise in suitable guides $l^2$ at the opposite ends of the bed A and preferably passes loosely through a hole in the brush carriage H. Springs M M' surround the shifting rod at opposite sides of the carriage and bear respectively against collars or blocks $m$ $m'$ secured to the rod, so that the brush carriage is adapted when traveling in one direction to engage the spring M, and when traveling in the opposite direction to engage the other spring. The collars or blocks $m$ $m'$ are preferably adjustably secured on the rod by suitable screws $m^2$ $m^3$.

N represents a controlling device adapted to coöperate with a plate or part $n$ attached to the shifting rod for holding and releasing the rod. In the construction shown, the controlling device consists of a lever pivoted on a stationary bracket or part of the machine at the head end thereof, and provided with a bolt $n'$ which is pressed against the plate $n$ by a spring $n^2$ connected to the lever, and is adapted when the shifting rod is moved to the position shown in Figs. 9 and 11 to spring into a hole $n^3$ in the plate to hold the shifting rod stationary. One end of the controlling lever N is located so as to be struck and moved to release the shifting rod by two tappets or projections $n^4$ on the wheel $d$ by which the tube holder is turned.

The brush reciprocating mechanism operates as follows: When the machine is at rest the drive belts K K′ run on the loose pulleys $k$ $k'$, as shown in Figs. 1 and 2, the feed screw then remaining stationary and holding the brush G at one end or the other of its travel. Assuming the parts to be in the position shown in Fig. 9, with the brush at the end of its travel to the left, the spring M compressed and the bolt of the controlling device N in the hole $n^3$ of the plate $n$ so as to hold the shifting rod from movement, the operator places a tube on the upper spindles of the tube holder and turns the holder one half revolution by means of the wheel $d$ to lower the tube into operative position opposite the air brush G. Just as the tube approaches the operative position, one of the tappets $n^4$ on the wheel $d$ strikes the controlling lever N and releases the belt shifting rod L. The spring M, which has already been placed under compression, reacting against the carriage H which is then held stationary by the screw I, moves the shifting rod to the left far enough to place the crossed belt K′ on the tight pulley $k^2$, and shift the straight belt K on the loose pulley $k$ away from the tight pulley, and the feed screw is turned in the direction to feed the brush G to the right, as indicated in Fig. 10. As the brush approaches the limit of its travel to the right the brush carriage H engages the other spring M′ and compresses it against the collar $m'$ until the pressure of the spring on the collar is sufficient to move the shifting rod L to the right far enough for the bolt of the controlling device N to snap into the hole $n^3$ and hold the shifting rod. This movement of the shifting rod is sufficient to move the crossed belt K′ off of the tight pulley $k^2$ onto the loose pulley $k'$ and shift the straight belt K on the loose pulley $k$ toward the tight pulley. Both belts will then be on the loose pulleys but the rotation of the feed screw will continue by reason of its momentum until the spring M′ is further compressed, after which the feed screw will come to rest with the parts in the position shown in Fig. 11. The operator having placed another tube in the holder while the first tube was being lacquered during the travel of the brush to the right, now turns the holder another half revolution to place the new tube in position for lacquering. The rotation of the holder actuates the controlling device N and releases the shifting rod as before and the compressed spring M′ shifts the shifting rod farther to the right, so as to place the straight belt K on the tight pulley $k^2$ and thus cause the reverse rotation of the feed screw and the travel of the brush to the left, as indicated in Fig. 12. When the brush approaches the limit of its travel to the left the spring M will be compressed and the shifting rod will be moved, as before, but to the left, far enough to shift the straight belt K from the tight pulley $k^2$ onto the loose pulley $k$ and place the hole $n^3$ in position for the bolt $n'$ to enter it and arrest the shifting rod. The feed screw will continue its rotation by momentum, as before, until the spring M is further compressed. The parts will then be again in the initial position, shown in Fig. 9, and the spring M under compression ready for repeating the operation above explained.

This invention is not necessarily limited to the particularly mechanism above described for reciprocating the brush or coating device, since mechanisms of different constructions adapted to operate the brush or coating device in a similar manner could be employed.

Any suitable means can be used for operating the air controlling valve $g^5$ to stop the discharge of lacquer when the brush reaches the end of its travel in each direction. A rotary valve $g^5$ is shown provided with a pinion O which meshes with a rack P secured to the plate $n$. When the shifting rod L is moved to the position shown in Figs. 9 and 11 to arrest the travel of the brush G the rack P turns the valve to shut off the air and stop the discharge of lacquer, and when the shifting rod is moved to either of the positions shown in Figs. 10 and 12 for causing the travel of the brush in either direction the rack P rotates the valve $g^5$ so as to turn on the air. Thus the discharge of lacquer is stopped whenever the brush comes to rest at the end of its travel in either direction and there is no waste of lacquer.

Q, Figs. 1 and 2, represents a belt connecting pulleys on the feed screw I and shaft E′ for driving the latter to revolve the tubes while being lacquered. Any other drive means for the shaft E′ could be used.

We claim as our invention:

1. In a machine for coating articles, the combination of a holder for the article to be coated, said holder having a part which is moved in positioning the article for coating, a coating device, feed mechanism for moving said coating device lengthwise relative to said holder, and means actuated by the movement of said movable part of said holder for controlling the operation of said feed mechanism.

2. In a machine for coating articles, the combination of means for holding and rotating the article to be coated, said means having a part which is moved in positioning the article for coating, a coating device, feed mechanism for moving said coating device lengthwise relative to said holder, and means actuated by the movement of said movable part of said holder for controlling the operation of said feed mechanism.

3. In a machine for coating articles, the combination of a coating device, means for holding a plurality of said articles, said means being movable for placing one article in operative relation to said coating device and removing another article from said operative relation, feed mechanism for moving said coating device lengthwise relative to said holding means, and means actuated by the movement of said holding means for controlling the operation of said feed mechanism.

4. The combination of a coating device, a holder for the articles to be coated which is movable to place the article in operative relation to said coating device, feed mechanism for moving said coating device lengthwise relative to said holder, and means controlled by the operation of said holder for setting said feed mechanism in motion, substantially as set forth.

5. The combination of a coating device, a holder for the articles to be coated which is movable to place the article in operative relation to said coating device, feed mechanism for moving said coating device lengthwise relative to said holder, and a controlling device for said feed mechanism which is actuated by said holder for setting said feed mechanism in operation, substantially as set forth.

6. The combination of a coating device, a holder for the articles to be coated which is movable to place the article in operative relation to said coating device, feed mechanism for moving said coating device lengthwise relative to said holder, means controlled by the operation of said holder for starting said feed mechanism, and means for arresting said coating device when it reaches the end of said article, substantially as set forth.

7. The combination of a coating device, a holder for the articles which is movable to place the articles in operative position relative to said coating device, a reversible feed device for moving said coating device lengthwise in opposite directions relative to said holder, and mechanism controlled by the operation of said holder for starting said feed mechanism to move said coating device in each of said opposite directions, substantially as set forth.

8. The combination of a coating device, a holder for a plurality of articles which is movable to place the articles one after another in operative relation to said coating device, feed mechanism for moving said coating device lengthwise relative to said holder, and means controlled by the operation of said holder for setting said feed mechanism in motion, substantially as set forth.

9. The combination of a coating device for discharging a liquid coating material in the form of a spray, a holder for a plurality of articles which is movable to place the articles one after another in position to be coated by said spray, feed mechanism controlled by the operation of said holder for moving said coating device lengthwise relative to said article, and means for revolving the articles while they are being coated, substantially as set forth.

10. The combination of a coating device, a holder for the articles which is movable to place the articles in operative position relative to said coating device, a feed device for moving said coating device lengthwise relative to said holder, belts for driving said feed device in opposite directions, a belt shifter which is operated by said coating device as it approaches the limit of its travel in each direction to stop said feed device, and means controlled by the operation of said holder for actuating said belt shifter to reverse the movement of said feed device, substantially as set forth.

11. The combination of a coating device, a holder for the articles which is movable to place the articles in operative position relative to said coating device, a feed device for moving said coating device lengthwise relative to said holder, belts for driving said feed device in opposite directions, a belt shifting rod arranged parallel with the direction of travel of said coating device, springs on said belt shifting rod each of which is adapted to be compressed by said coating device during its travel in one direction and moves said shifting rod for stopping said feed device, and a controlling device which coöperates with said shifting rod to limit said movement thereof, said controlling device being actuated by said holder to release said shifting rod and permit the further movement thereof by said compressed spring for reversing the motion of said feed device, substantially as set forth.

12. The combination of a coating device, a holder for the articles which is movable to place the articles in operative position relative to said coating device, a feed device for moving said coating device lengthwise relative to said holder, belts for driving said feed device in opposite directions, a belt shifter which is operated by said coating device as it approaches the limit of its travel in each direction to stop said feed device, means controlled by the operation of said holder for actuating said belt shifter to reverse the movement of said feed device, and means actuated by said belt shifter for starting and stopping the discharge from said coating device, substantially as set forth.

13. The combination of a coating device, a holder for the articles which is movable to place the articles in operative position relative to said coating device, a feed device for moving said coating device lengthwise relative to said holder, belts for driving said feed device in opposite directions, a belt shifting rod arranged parallel with the direction of travel of said coating device, springs on said belt shifting rod each of which is adapted to be compressed by said coating device during its travel in one direction, a controlling device which stops the movement of said shifting rod by said spring when the drive belts have been shifted far enough to stop said feed device, said controlling device being actuated by said holder to release said shifting rod and permit said spring to move said shifting rod and the drive belts far enough to reverse the motion of said feed device, substantially as set forth.

Witness our hands this 21st day of October, 1912.

CHARLES VALLONE.
JOHN H. ILLIG.

Witnesses:
A. W. KIRTON,
A. YALLOWICH.